US012266239B2

United States Patent
Morgan (10) Patent No.: US 12,266,239 B2
(45) Date of Patent: Apr. 1, 2025

(54) SYSTEM AND METHOD FOR FANTASY SPORT BETTING

(71) Applicant: Chris Morgan, Manchester, NH (US)

(72) Inventor: Chris Morgan, Manchester, NH (US)

(*) Notice: Subject to any disclaimer, the term of this patent is extended or adjusted under 35 U.S.C. 154(b) by 1 day.

(21) Appl. No.: 17/860,144

(22) Filed: Jul. 8, 2022

(65) Prior Publication Data

US 2023/0252849 A1 Aug. 10, 2023

Related U.S. Application Data

(60) Provisional application No. 63/308,396, filed on Feb. 9, 2022.

(51) Int. Cl.
  *G07F 17/32* (2006.01)
  *A63F 13/828* (2014.01)

(52) U.S. Cl.
  CPC ........ *G07F 17/3244* (2013.01); *A63F 13/828* (2014.09); *G07F 17/3288* (2013.01)

(58) Field of Classification Search
  CPC ............. G07F 17/3241; G07F 17/3244; G07F 17/3288; A63F 13/828
  See application file for complete search history.

(56) References Cited

U.S. PATENT DOCUMENTS

| | | | |
|---|---|---|---|
| 8,523,657 B2 | 9/2013 | Michaelson | |
| 9,536,385 B2 | 1/2017 | Fine | |
| 9,773,373 B2 | 9/2017 | Katz | |
| 9,786,127 B2 | 10/2017 | Marshall | |
| 10,867,474 B2 | 12/2020 | Yi | |
| 10,885,740 B2 | 1/2021 | Higgins | |
| 11,769,121 B2* | 9/2023 | Cupersmith | G05D 1/0044 700/246 |
| 2006/0212803 A1* | 9/2006 | Arokiaswamy | G06F 16/972 715/201 |
| 2015/0209678 A1 | 7/2015 | Edwards | |
| 2017/0026261 A1* | 1/2017 | Zehri | H04L 47/17 |
| 2017/0092060 A1 | 3/2017 | Toohey | |
| 2020/0042989 A1* | 2/2020 | Ramadoss | G06Q 20/065 |
| 2020/0117658 A1* | 4/2020 | Venkata | G06F 16/248 |
| 2020/0372763 A1* | 11/2020 | Greiner, Jr. | G07F 17/3288 |
| 2021/0065516 A1* | 3/2021 | Warren | G07F 17/3272 |
| 2021/0082255 A1 | 3/2021 | Pierce | |

(Continued)

FOREIGN PATENT DOCUMENTS

| | | |
|---|---|---|
| AU | 2014227522 A1 | 9/2014 |
| KR | 10-2361274 B1 | 2/2022 |

OTHER PUBLICATIONS

What Are Public and Private Keys? (Year: 2024).*

(Continued)

*Primary Examiner* — James S. McClellan
*Assistant Examiner* — Ross A Williams
(74) *Attorney, Agent, or Firm* — Lambert Shortell & Connaughton; David J. Connaughton, Jr.; Justin P. Tinger (57) ABSTRACT

An improved system and method for fantasy sports betting is disclosed herein. The system and method provides for an online website or application that utilizes cryptocurrency as the only funding a distribution source for game play by individual players or participants. The present disclosure solves a number of problems in multiple fields of art, most notably, in the field of computers or computerized devices.

20 Claims, 4 Drawing Sheets

(56) References Cited

U.S. PATENT DOCUMENTS

| | | | |
|---|---|---|---|
| 2021/0280016 A1 | 9/2021 | Oberberger | |
| 2023/0033600 A1* | 2/2023 | Nelson | H04L 9/3236 |
| 2023/0118568 A1* | 4/2023 | Guy | G07F 17/3241 |
| | | | 463/25 |
| 2023/0120231 A1* | 4/2023 | Gupta | G07F 17/3239 |
| | | | 463/7 |
| 2023/0169826 A1* | 6/2023 | Higgins | G07F 17/323 |
| | | | 463/25 |
| 2023/0252849 A1* | 8/2023 | Morgan | A63F 13/828 |
| | | | 463/25 |
| 2023/0281583 A1* | 9/2023 | Jakobsson | H04L 67/306 |
| | | | 705/67 |
| 2023/0281606 A1* | 9/2023 | Jakobsson | G06Q 20/3829 |
| | | | 705/67 |
| 2023/0298435 A1* | 9/2023 | Dalmia | G07F 17/3241 |
| | | | 463/42 |

OTHER PUBLICATIONS

Nicole Bastos, A Change on The Horizon for The Gaming Industry: Trends, Blockchain Technology, and Cryptocurrency, Journal, 2020, 26, vol. 10:117, UNLV Gaming Law Journal.

* cited by examiner

SYSTEM AND METHOD FOR FANTASY SPORT BETTING

BACKGROUND

Technical Field

The present disclosure relates generally to an improved system and method for fantasy sports betting. More particularly the present disclosure relates to a system and method that advantageously combines the use of cryptocurrency with skill-based daily fantasy sports betting.

Description of Related Art

Betting on games of chance, such as craps, roulette, slot machines, and the like is widespread and well-known around the world. Betting on or winning money from games of chance, also known as gambling, is distinct from winning money by playing games of skill, such as billiards, tennis, and other sports, because the results of games of skill are largely dependent on a player's effort, ability, and knowledge, not the size of a player's wallet. For example, a tennis player who wins a tournament may win prize money without it being considered gambling. However, a member of the audience watching the tennis tournament and betting on the outcome may be considered gambling because the audience member will win money based solely on the size of their bet and luckily being correct on the outcome of the tournament.

The distinction between gambling and not gambling is important because many states and countries either prohibit or greatly restrict who can gamble and where gambling takes place. One area where this distinction is particularly important is in the field of fantasy sports betting. With fantasy sports betting, participants select a team of players from a variety of different teams, typically from the same sport, in order to create a fantasy roster. Participants in the fantasy sport game then win money based on how well their roster performs compared to other participants' rosters. Most states consider fantasy sports betting a game of skill, not a game of chance, and thus, fantasy sports betting is mostly legal and less regulated.

There are a variety of different known methods and systems for conducting a fantasy sport betting game; however, there are a countless number of ways to improve on these known methods and systems. Therefore, what is needed is an improved system and method for fantasy sport betting having the following characteristics and benefits over the prior art.

SUMMARY

The subject matter of this application may involve, in some cases, interrelated products, alternative solutions to a particular problem, and/or a plurality of different uses of a single system or article.

In one aspect, a method and system for fantasy sports betting is disclosed. In this aspect, the method comprises the steps of creating a fantasy sport betting account, transferring cryptocurrency to fund the account, creating a fantasy sport roster, placing a bet on an outcome of a fantasy sport game, and withdrawing cryptocurrency from the account. The system comprises a computerized device and a processor. The processor is stored in a non-transitory computer-readable medium, and the processor is operable to receive instructions allowing the processor to conduct the steps of the method on the computerized device.

In another aspect, a computerized system and method for fantasy sports betting is disclosed. In this aspect, the computerized system comprises a server, a database, a first computerized device, a second computerized device, and a processor. The first computerized device and the second computerized device are in networked electronic communication with the server and the database, and the processor is stored in a non-transitory computer-readable medium and operable to receive instructions allowing it to conduct the steps of the method. In this aspect the method also comprises the steps of creating a fantasy sport betting account, transferring cryptocurrency to fund the account, creating a fantasy sport roster, placing a bet on an outcome of a fantasy sport game, and withdrawing cryptocurrency from the account.

It should be expressly understood that the various physical elements of the present disclosure summarized and further disclosed herein may be of varying sizes, shapes, or otherwise dimensions and made from a variety of different materials or methods of manufacture without straying from the scope of the present disclosure.

DETAILED DESCRIPTION

The detailed description set forth below in connection with the appended drawings is intended as description of presently preferred embodiments of the invention and does not represent the only forms in which the present disclosure may be constructed and/or utilized. The description sets forth the functions and the sequence of steps for constructing and operating the invention in connection with the illustrated embodiments. Throughout this description, specific details are set forth in order to provide a thorough understanding of the examples disclosed. In other instances, well-known methods, procedures, components, and material have not been described in detail as not to unnecessarily lengthen the present disclosure.

Generally, the present disclosure concerns an improved system and method for fantasy sports betting. More particularly the present disclosure relates to a system and method that advantageously combines the use of cryptocurrency with skill-based fantasy sports betting. As used herein, the term "fantasy sport(s)" shall refer to a computerized game or system wherein participants select team of players from a variety of different real-world teams, typically from the same sport, in order to create a fantasy roster that is then compared to other participants' fantasy rosters to determine a winner. It should be expressly understood that the plain and ordinary meaning of the term "fantasy sport(s)" does not refer to real-world, physical sports. While fantasy sports are based on real-world information regarding real-world athletes, sports teams, matches, and the like, betting on fantasy sports is much different than betting on real-world outcomes. This distinction may be considered critical to the present disclosure due, at least in part, to the aforementioned regulatory difference between gambling and skill-based betting games.

Another critical distinction is the difference between "fantasy sport(s)" and "daily fantasy sport(s)." When the term "fantasy sport(s)" is used, it should be expressly understood that this term is referring to either games that take place over the course of an entire season for a single sport or a generic term for fantasy sport games. Contrarily, when the term "daily fantasy sport(s)" is used, it should be understood that this term is referring to games that take place in a matter of days or hours for a variety of sports. The critical difference between fantasy sports and daily fantasy sports is that participants in a daily fantasy sports game draft their athletes over much shorter time periods, and thus, much more skill is involved. The reason for this is that with fantasy sports, a draft occurs in the beginning of a relevant sport season, which means there is a greater chance that unforeseen circumstances may affect a fantasy roster (e.g., player injury, disqualification, and the like). In other words, since there is a lot less time for unforeseen circumstances to affect the results of a fantasy roster matchup in daily fantasy sports, the results of daily fantasy sports games are more likely to be based on skill than those of fantasy sports.

Some embodiments of the present disclosure may be practiced on a computer system that includes, in general, one or a plurality of processors for processing information and instructions, random access memory ("RAM"), for storing information and instructions, read-only memory ("ROM"), for storing static information and instructions, a data storage unit, such as a magnetic or optical disk and disk drive for storing information and instructions, modules as software units executing on a processor, an optional user input and/or output device, such as a display screen device (e.g. a monitor), for displaying a graphical user interface to an end user.

As will be appreciated by those skilled in the art, the present examples may be embodied, at least in part, by computer program product or application embodied in any tangible medium of expression having computer-usable program code stored therein. For example, some embodiments described below may be implemented by computer program instructions. The computer program instructions may be stored in a non-transitory computer-readable medium and/or hard drive that can direct a computer or other programmable data processing apparatus to function in a particular manner, such that the instructions stored in the computer-readable medium constitute an article of manufacture including instructions and processes which implement the function, act, or step specified in a flowchart and/or block diagram. These computer program instructions may be provided to a processor of a computer or other programmable data processing apparatus to produce a machine, such that the instructions, which execute via the processor of the computer or other programmable data processing apparatus, create a method for implementing the function or acts specified in a flowchart and/or block diagram. The present disclosure contemplates various versions of the disclosed computer application, including, but not limited to a mobile device and/or cloud-based application.

The computerized fantasy sports betting application disclosed herein may allow end users to log in via their own computers or computerized devices (e.g., mobile devices) to a system storing the data relating to the system, user interface information, and having networked access to pertinent fantasy sport betting information, such as players, player statistics, team matchups, game scores, and the like. The user interface may allow end users to create their own fantasy rosters by selecting players from real-world sports teams, and it may also allow end users to compete against others by comparing scores on their fantasy rosters to determine a winner.

In one embodiment, a score on a fantasy roster is determined by the real-world performance of individual players on the fantasy roster in a real-world, physical sports game. For example, on a fantasy basketball roster, the roster's score may depend on how many shots are scored by individual roster players in a real-world basketball game. In many embodiments, points may depend on a variety of metrics, such as player rebounds, blocks, and the like. Moreover, how points may be calculated on a fantasy roster are sport specific. For example, in a fantasy football roster points may be calculated based on running yards, number of receptions, and the like; whereas, a fantasy roster from another sport may not take into account the distance a player runs, but rather may take into account other sport specific metrics.

In all embodiments, cryptocurrency is the sole method of funding, betting, and receiving payments to and from the fantasy sport betting application and/or website. By providing a computerized system that utilizes cryptocurrency in this way, the present disclosure solves several technical problems; however, an understanding of how cryptocurrency works is critical to understanding the problems solved by the present disclosure. While there are many different types of cryptocurrencies, most function by using blockchain technology.

Blockchain technology essentially utilizes a chain of "blocks" made up of pieces of digital information that relate to transactions that have taken place. Blocks on a blockchain store three important pieces of information about each transaction that occurs. The first piece of information stored is information about the date, time, and amount of the transaction. The second piece of information stored in the block is information about each participant in the transaction. The transaction participants are each represented by a unique digital signature, thus making the transaction anonymous. The third piece of information stored in the block is an identifier that distinguishes the block from all other blocks. Specific block identifiers may also be referred to as a "hashes", which are generated by special algorithms.

The blockchain, which is used to record and verify cryptocurrency transactions, may be accessible through a peer-to-peer network formed from a plurality of computers and/or servers, such as the internet. By being accessible over a network, information on the blockchain may be publicly available to essentially any computer with an internet connection. This feature allows the blockchain to essentially function as a public ledger for cryptocurrency transactions. When cryptocurrency is transferred from one crypto holder to another, the transaction must be verified as accurate, and if it is, the transaction information is then stored in a block, given a hash, and added to the blockchain. The transaction is verified as accurate by a network of thousand, if not millions, of computers, which means a plethora of identical copies of the same transaction block may be distributed across the network and/or internet. This decentralization of information makes blockchain information nearly impossible to manipulate.

Cryptocurrencies are stored in digital wallets, and a cryptocurrency transaction involves the transfer of cryptocurrency from one digital wallet to another over the blockchain. While it is true that information on the blockchain is publicly available, the digital wallets of crypto holders are not. This is the case because the digital wallets of crypto holders are encrypted. Digital crypto wallets may be decrypted through the use of a private key that only the wallet owner has access to. When a transfer of cryptocurrency occurs, the blockchain uses the private key to verify the transfer, and a public key is used to determine the location of the digital wallet. The public key is an address on the network and/or the internet where the cryptocurrency may be stored, so a crypto digital wallet is essentially a pairing of a private and public key.

While almost all cryptocurrency relies on blockchain technology, there are still a wide variety of cryptocurrencies that have different goals and function in different ways. For example, Bitcoin, is a proof-of-work cryptocurrency which requires a plurality of decentralized computer nodes, also referred to as miners, to verify individual transaction blocks. As will be appreciated by those skilled in the art, proof-of-work cryptocurrencies like Bitcoin require a large amount of electricity consumption to verify transactions. As one potential solution, different types of cryptocurrency that use comparatively less energy consumption than Bitcoin may be utilized.

Critically, proof-of-stake cryptocurrencies, such as Factom, only require a single assigned node to verify a transaction. Accordingly, one embodiment may only utilize proof-of-stake cryptocurrencies. In another embodiment, cryptocurrencies that utilize smart contracts, such as Ethereum and NEO, may be used. Critically, cryptocurrencies that utilize smart contracts allow for the automatic execution and/or verification of transactions when certain perimeters are met. Similar to proof-of-stake cryptocurrencies, cryptocurrencies that utilize smart contracts may be used as a critical alternative to proof-of-work cryptocurrencies, such as Bitcoin, especially when energy efficiency is a concern.

While different cryptocurrencies may be used in different embodiments to reduce the energy consumption of the system, the present disclosure generally solves a number of technical problems by utilizing any cryptocurrency, instead of fiat currency, as the sole method for funding and receiving payments to and from a fantasy sports account. One technical problem solved is the reduction in the cost and speed of transfers. When fiat currency is used in a transaction, the transfer of funds may be facilitated by a third party, such as an individual, a central bank, or a clearing house. This third-party processing system often results in high processing fees and times for transfers of fiat currency. On the other hand, by utilizing the blockchain, cryptocurrency may be transferred from one digital wallet to another without the use of any third-party processing system or method. This may result in comparatively lower costs and quicker processing times for transfers of cryptocurrency.

While achieving lower transaction costs and quicker transfer and/or processing times with cryptocurrency is certainly a technical, computer-related improvement over computer systems that use fiat currency, there may still be some costs associated with a cryptocurrency transaction. For example, some networks that validate cryptocurrency transactions may charge processing or "gas" fees, which represent the cost of the computing power needed to validate a particular cryptocurrency transaction. Some embodiments of the fantasy sports betting system disclosed herein may explicitly not charge gas fees in an effort to further solve the problems associated with transaction costs. Moreover, in an effort to incentivize participation in the fantasy sport betting system, at least one embodiment may reward ends users with an amount of cryptocurrency or loyalty points that may be redeemable for cryptocurrency for performing certain actions. For example, an end user may receive cryptocurrency or loyalty points for creating an account or winning a matchup.

Another technical problem solved by using cryptocurrency as the sole method for funding and betting on a fantasy sports game is that blockchain transaction data is considerably more secure than other centralized forms of electronic data storage. For example, with fiat currency, transaction information is stored in a centralized physical or cloud-based server location, which makes electronic data concerning fiat currency transactions more susceptible to security breaches than blockchain data. The reason for this improved security that blockchain data is decentralized across a network of peer-to-peer computers. Similarly, yet another problem solved is data retention. In other words, because blockchain transaction data is copied and dispersed across a plurality of computers, it is almost impossible to delete, let alone modify. Thus, especially when compared to other systems that utilize fiat currency as either one method or the sole method of exchange, the present disclosure represents a dramatic increase in security.

Unrelated to the problems solved by cryptocurrency, and in one embodiment of the system, a component of the system may be operable to display research tools for real-world athlete metrics on the same user interface as a fantasy roster. This embodiment solves a problem unique to computerized systems, which have limited available screen space, especially when using portable or mobile devices, such as tablets and smartphones. The problem is that accessing robust research tools for athlete metrics may require navigation to user interfaces that are separate from the user interface that may be displayed by a fantasy sports application. The present disclosure solves this problem by providing, an embodiment that is operable to display research tools for athlete metrics on the same user interface as a fantasy roster.

In one embodiment, this solution is accomplished by at least one component of the system being operable to allow an end user to select user interfaces displaying real-world player metrics that are separate from the user interface of the fantasy sports betting application disclosed herein, such as, a separate website or application. Once a separate user interface is selected, a component of the system may be operable to automatically link a research metric or other piece of relevant information from the separate user interface. Upon actuation of the link such as a research icon or other indicator in the graphical user interface of the present system, a window such as a pop-up window, embedded window, or in line information which pushes adjacent content up or down on the page may be presented. The source of the content in such a window may be from the external source (i.e., the separate user interface), but is embedded within the user interface of the present system. This ensures that users remain engaged with the present interface without leaving. As previously mentioned, this solves the computer-specific problem that users may lose interest and get frustrated when navigating away from the user interface of the present system to research real-world athlete metrics or other relevant information.

Figure 1:
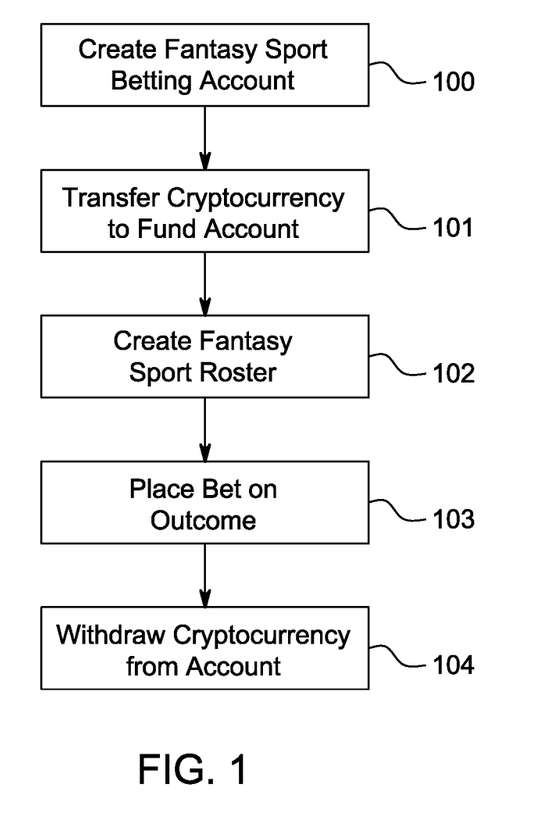
FIG. 1 provides a flow chart of an embodiment of the steps of a method according to the present disclosure.

Turning now to FIG. 1, which provides a flow chart for an embodiment of the steps that may be carried out by an end user according to the present disclosure. In this embodiment, a user may initially conduct the step of creating an account on the fantasy sport betting application or website 100, which may include the step or creating a username and password. The user may then conduct the step of transferring an amount of cryptocurrency to fund the account 101. The step of transferring an amount of cryptocurrency 101 may include the steps of inputting a private key to verify the transaction on the blockchain. Once a user's account is funded with the cryptocurrency of their choice, the user may conduct the step of creating a fantasy sport roster 102. The step of creating a fantasy sport roster 102 may include the steps of researching player statistics and selecting individual players for inclusion on the roster.

Once a user conducts the step of creating a roster 102, the player may wish to conduct the step of placing a bet on an outcome of a fantasy sport game 103. In one embodiment, the fantasy sport game may be require an entry fee for users to participate. In such an embodiment, the step of placing a bet on an outcome of a fantasy sport game 103 may include the step of paying the entry fee. In one embodiment, the fantasy sport game may be a "double-up" game, wherein the user is guaranteed a one hundred percent (100%) return on their entry fee if they finish within a pre-determined percentage of users, for example, in the top fifty percent (50%). In another embodiment, the fantasy sport game may be a "head-to-head" game, wherein a first user competes solely against a second, other user to win an amount of cryptocurrency based on the size of the bet and/or entry fee. In yet another embodiment, the fantasy sport game may have a guaranteed prize pool that may offer tiered payouts based on a user's fantasy roster performance as compared to the rosters of other users. If a user has accumulated a balance in their fantasy sports betting account, a user may wish to conduct the step of withdrawing an amount of cryptocurrency from the account 104. The step of withdrawing the cryptocurrency 104 may also comprise the step of inputting a private key to validate the transfer on the blockchain.

Figure 2:
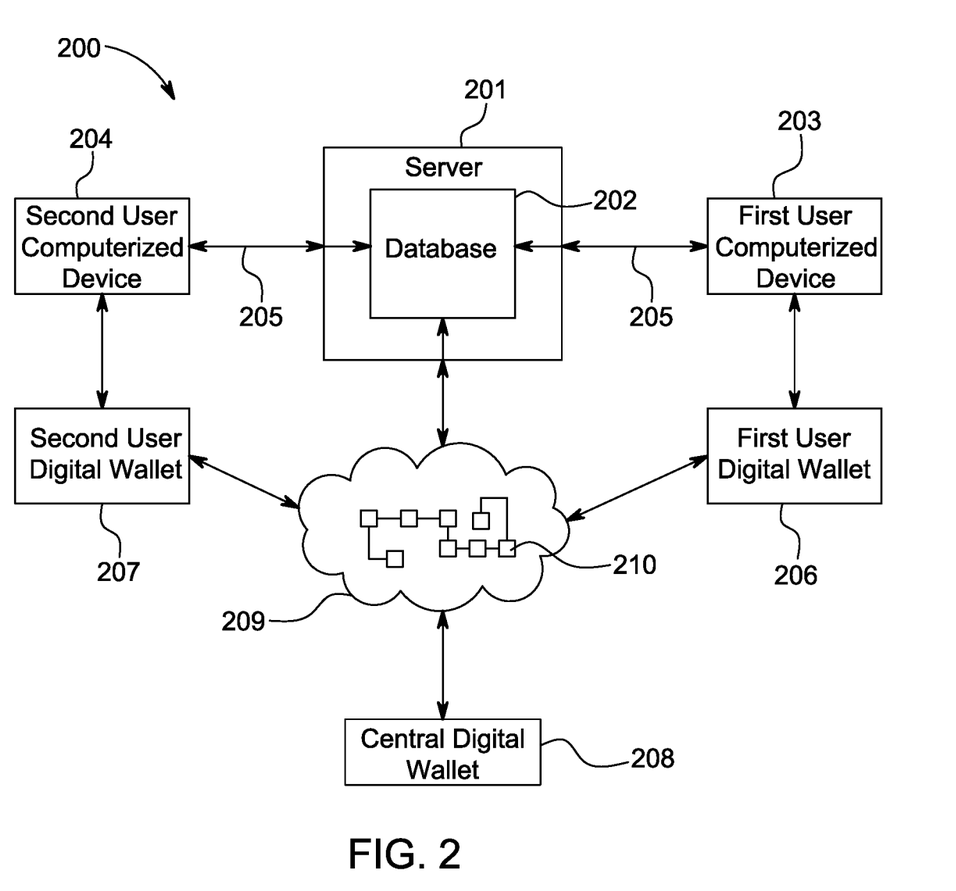
FIG. 2 provides a schematic view of an embodiment of a computerized system according to the present disclosure.

FIG. 2 provides a schematic view of an embodiment of a computerized system 200 that allows the fantasy sport betting application and/or website to function. In this embodiment, the system 200 comprises a server 201 and database 202, which may be operable to instruct or receive instructions from a processor to carry out steps that may be required for the operation of the fantasy sport betting application and/or website. In this embodiment a first user computerized device 203 and a second user computerized device 204 are in electronic communication with the server 201 and the database 202 via electronic communication lines 205. In this embodiment, the electronic communication lines 205 may be a wired or wireless network connection. In this embodiment the first user computerized device 203 and the second user computerized device 204 may be operable to transmit, receive, and display electronic information from the server 201 or database 202. The computerized devices 203, 204 may comprise appropriate hardware for accomplishing said operations such as a input device (e.g., keyboard, touch-screen key pad, mouse, etc.), a wireless transceiver, a graphical user interface, and the like.

Also, in this embodiment, and still referring FIG. 2, the first user computerized device 203 and the second user computerized device 204 are in electronic communication with a first user digital wallet 206 and a second user digital wallet 207, respectively, via electronic communication lines 205. In this embodiment, both the first user digital wallet 206 and the second user digital wallet 207 may be operable to transmit an amount of cryptocurrency to a central digital wallet 208 upon the receipt of a private key input from either the first user computerized device 203 or the second user computerized device 204, respectively. The transfer of cryptocurrency from the first user digital wallet 206 or the second user digital wallet 207 to the central digital wallet 208 is facilitated by communication between these components of the system through communication lines 205 over the internet 209, where the transfer of cryptocurrency is verified by the blockchain 210, which is also in electronic communication with the digital wallets 206, 207, and 208.

As shown in FIG. 2, the central digital wallet 208 is also in electronic communication with the server 201 and the database 202 via communication lines 205 through a network and/or internet 209 connection. Thus, in this embodiment, the server 201 and/or the database 202 may store electronic information concerning the total amount of cryptocurrency in a central digital wallet 208. In this way, the server 201 and/or the database 202 are also operable to instruct the central digital wallet 208 to transfer an amount of cryptocurrency to either the first user digital wallet 206 or the second user digital wallet 207 over the internet 209, wherein the transfer is also verified on the blockchain 210.

Figure 3:
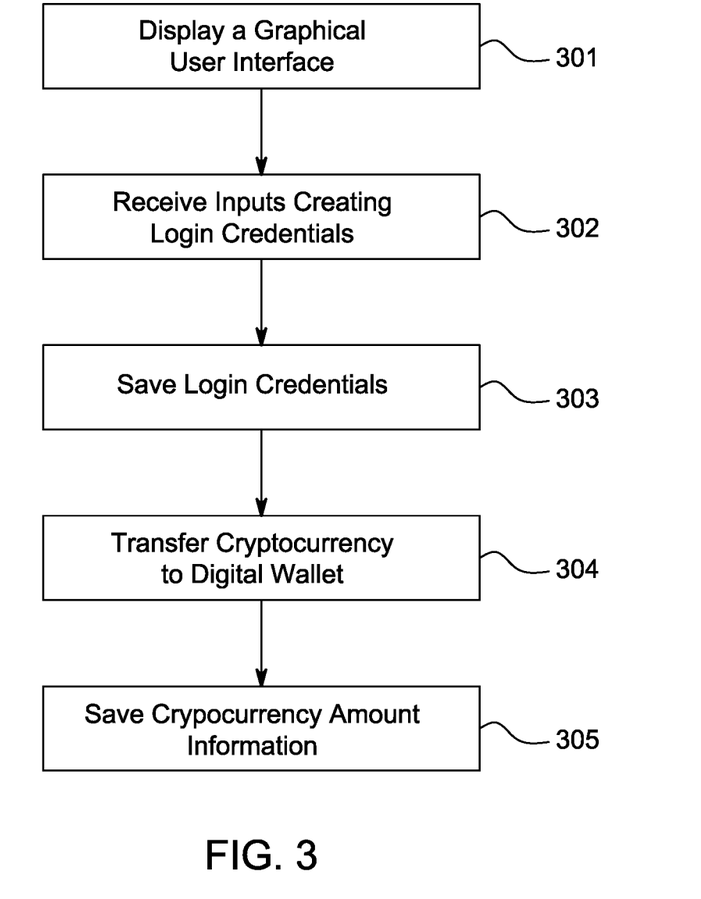
FIG. 3 provides a flow chart of another embodiment of the steps of a method according to the present disclosure.

Turning now to FIG. 3, which provides a flow chart of an embodiment of the steps of a method that may be carried out by at least one of the components of the system 200 described in FIG. 2. For example, in this embodiment, one of the components of the system 200 may instruct a processor to perform the step of displaying a graphical user interface 301. In this embodiment, the components of the system 200 that are operable to display a graphical user interface 301 are the first user computerized device 203 and the second user computerized device 204. As also shown in FIG. 3, the method performed by the processor may also comprise the step of receiving inputs creating login credentials 302. The login credentials may be a username and password for a fantasy sport betting account. Similar to the previous step 301, the first user computerized device 203 and the second user computerized device 204 are the components of the system 200 that are operable to perform this step 302. In this embodiment, the method also comprises the step of saving the login credentials 303. Any component of the system 200 may be operable to perform this step 303 (e.g., the server 201, the database 202, or the computerized devices 203, 204).

In this embodiment, and still referring to FIG. 3, a component of the system 200 may also be operable to conduct the method step of transferring cryptocurrency to a digital wallet 304. This step 304 is performed by either a user digital wallet 206, 207 or the central digital wallet 208, depending on whether a user wishes to deposit or withdraw cryptocurrency from their fantasy sport betting account. When cryptocurrency is transferred, a component of the system 200 may keep track of the amount of cryptocurrency in the central digital wallet 208. The goal of keeping track of the amount of cryptocurrency in the central digital wallet 208 is performed by at least one of the server 201 or the database 202 instructing a processor to carry out the step of saving information relating to cryptocurrency amounts 305.

Figure 4:
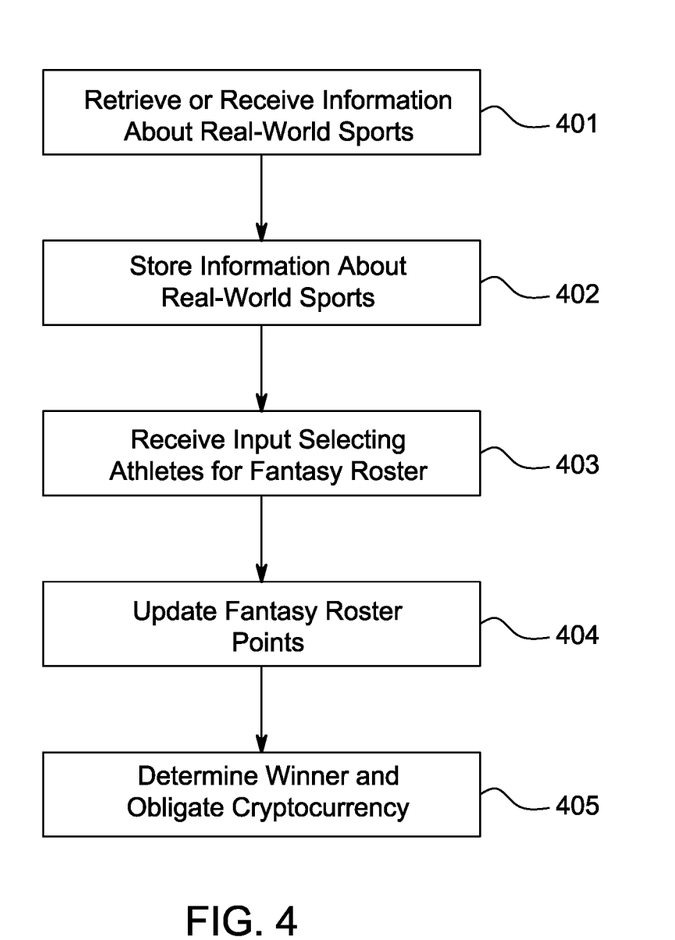
FIG. 4 provides a flow chart of yet another embodiment of the steps of a method according to the present disclosure.

As shown in FIG. 4, additional method steps are required to operate an embodiment of the system 200. In this embodiment, at least one component of the system 200 is operable to instruct a processor to conduct the step of retrieving or receiving information about real-world sports 401. This step 401 may require at least one of the server 201 or a user computerized device 203, 204 to retrieve or receive information from the internet 209 through communication lines 205. The information about real-world sports may include information concerning sports teams, individual athletes, scores of real-world games, and the like. In this embodiment, at least one of the server 201, the database 202, or a user computerized device 203, 204 is operable to conduct the step of storing the information about real-world sports 402 in order to increase the processing speed of the system 200.

In the embodiment shown in FIG. 4, in order for end users to play a fantasy sports betting matchup, the user computerized devices 203, 204 are operable to receive an input selecting athletes for inclusion in a fantasy roster 403. This step 403 is repeated until the system 200 creates a fantasy roster. During the course of a fantasy sport betting game, at least one of the server 201 or a user computerized device 203, 204 are operable to instruct a processor to conduct the step of updating points for a fantasy roster 404. This step 404 may include the step of updating points for individual athletes on the fantasy roster and calculating and displaying a total score for the roster.

At the conclusion of a fantasy sport betting game, at least one of the server 201, the database 202, or the user computerized devices 203, 204 are operable to determine a winner based on a comparison of total roster scores and obligate an amount of cryptocurrency to the winner 405. In this embodiment, the step of obligating an amount of cryptocurrency to the winner 405 requires at least one or the server 201 or the database 202 to update an account of the appropriate end user to reflect the amount of cryptocurrency owed to said end user upon the end user's withdrawal of cryptocurrency from their account. The step 405 does not include the step 304 of transferring cryptocurrency from the central digital wallet 208 to a user's digital wallet 206, 207. Rather, the step 405 is an intermediate step required before the server 201 or the database 202 instructs the central digital wallet 208 to transfer an amount of cryptocurrency to a user's digital wallet 206, 207.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements described in one embodiment may be incorporated with any other embodiment in combination with any other elements disclosed herein is the various embodiments. It is also to be expressly understood that any modifications and adaptations to the present disclosure are within the spirit and scope of the present disclosure, and are inclusive, but not limited to the following appended claims as set forth.

What is claimed is:

1. A method and system for fantasy sports betting, the method comprising steps of:
creating a fantasy sport betting account;
transferring cryptocurrency to fund the fantasy sport betting account;
wherein, the transfer includes inputting a first private key for verification on a first blockchain;
creating a fantasy sport roster;
placing a bet on an outcome of a fantasy sport game;
wherein the outcome is determined by:
determining a score of the fantasy sport roster by real-world performances of players on the fantasy roster;
comparing the score with a second score of a second fantasy sport roster created by an opponent;
withdrawing cryptocurrency from the fantasy sport betting account;
wherein, the withdrawal includes inputting a second private key for verification on a second blockchain;
wherein, each block on the first and second blockchains stores three pieces of information about each transaction:
wherein, the first piece of information includes a date, time, and amount of the transaction;
wherein, the second piece of information is about each participant in the transaction;
wherein, each participant is represented by a unique digital signature, making the transaction anonymous;
wherein, the third piece of information is a block-specific identifier;
the system comprises:
a computerized device and a processor, wherein the processor is stored in a non-transitory computer-readable medium; and
the processor is operable to receive instructions allowing the processor to conduct the steps of the method on the computerized device, wherein the processor is further operable to:
wherein, the computerized device is in electronic communication with a first user digital wallet via one or more electronic communication lines;
wherein, the first user digital wallet is operable to transmit an amount of cryptocurrency to a central digital wallet upon a receipt of a target private key input;
wherein, a public key, which is an address on a local network or internet, is used to determine the location of the first user digital wallet or the central digital wallet;
display a first user interface for the fantasy sport roster;
receive an input selecting a link to an external website comprising a second user interface;
display the second user interface from the external website as an embedded window within the first user interface, such that the second user interface can be accessed without navigating away from the first user interface;
wherein, the second user interface displays research tools for real-world athlete metrics, based on a user's selection of a third and separate user interface;
wherein the real-world athlete metrics include sports teams, individual athletes, and scores of games;
wherein, the computerized device or the processor is operable to automatically link a research metric or other piece of relevant information from the third separate user interface;
wherein, the computerized device or the processor is operable to store data about the real-world athlete metrics;
wherein, the cryptocurrencies can be replaced by proof-of-stake cryptocurrencies or smart-contract-based cryptocurrencies.

2. The method and system of claim 1 wherein the fantasy sport betting account consists of a daily fantasy sport betting account.

3. The method and system of claim 1 wherein the fantasy sport game consists of a daily fantasy sport game.

4. The method and system of claim 1, the method further comprising displaying a graphical user interface on the computerized device.

5. The method and system of claim 1, the method further comprising receiving inputs for creating a login credential on the computerized device.

6. The method and system of claim 1, the method further comprising transferring cryptocurrency to a digital wallet.

7. The method and system of claim 1, the method further comprising receiving inputs for selecting athletes for inclusion in the fantasy sport roster on the computerized device.

8. The method and system of claim 1, the method further comprising updating points for the fantasy sport roster on the computerized device.

9. A computerized system and method for fantasy sports betting, the computerized system comprising:
- a server, a database, a first computerized device, a second computerized device;
- wherein the first computerized device, and the second computerized device are in networked electronic communication with the server and the database;
- wherein, the computerized device is in electronic communication with a first user digital wallet via one or more electronic communication lines;
- wherein, the first user digital wallet is operable to transmit an amount of cryptocurrency to a central digital wallet upon a receipt of a target private key input;
- wherein, a public key, which is an address on a local network or internet, is used to determine the location of the first user digital wallet or the central digital wallet;
- a processor, wherein the processor is stored in a non-transitory computer-readable medium and is operable to receive instructions allowing the processor to conduct steps of a method;
- the method comprising:
  - creating a fantasy sport betting account;
  - transferring cryptocurrency to fund the fantasy sport betting account;
    - wherein, the transfer includes inputting a first private key for verification on a first blockchain;
  - creating a fantasy sport roster;
  - placing a bet on an outcome of a fantasy sport game;
    - wherein the outcome is determined by:
      - determining a score of the fantasy sport roster by real-world performances of players on the fantasy roster;
      - comparing the score with a second score of a second fantasy sport roster created by an opponent;
  - withdrawing cryptocurrency from the fantasy sport betting account;
    - wherein, the withdrawal includes inputting a second private key for verification on a second blockchain;
    - wherein, each block on the first and second blockchains stores three pieces of information about each transaction:
      - wherein, the first piece of information includes a date, time, and amount of the transaction;
      - wherein, the second piece of information is about each participant in the transaction;
        - wherein, each participant is represented by a unique digital signature, making the transaction anonymous;
      - wherein, the third piece of information is a block-specific identifier;
  - displaying a first user interface for the fantasy sport roster;
  - receiving an input selecting a link to an external website comprising a second user interface;
  - displaying the second user interface from the external website as an embedded window within the first user interface, such that the second user interface can be accessed without navigating away from the first user interface;
  - wherein, the second user interface displays research tools for real-world athlete metrics, based on a user's selection of a third and separate user interface;
    - wherein the real-world athlete metrics include sports teams, individual athletes, and scores of games;
    - wherein, the computerized device or the processor is operable to automatically link a research metric or other piece of relevant information from the third separate user interface;
  - wherein, the computerized device or the processor is operable to store data about the real-world athlete metrics;
  - wherein, the cryptocurrencies can be replaced by proof-of-stake cryptocurrencies or smart-contract-based cryptocurrencies.

10. The computerized system and method of claim 9, the computerized system further comprising a first digital wallet, a second digital wallet, and a central digital wallet.

11. The computerized system and method of claim 10, wherein the first digital wallet, the second digital wallet, and the central digital wallet are in electronic communication with each other and a blockchain through a plurality of internet communication lines.

12. The computerized system and method of claim 11, the method further comprising verifying a transfer of cryptocurrency by the blockchain.

13. The computerized system and method of claim 9, the method further comprising saving a login credential by at least one of the server, the first computerized device, or the second computerized device.

14. The computerized system and method of claim 9, the method further comprising saving information relating to an amount of cryptocurrency by at least one of the server or the database.

15. The computerized system and method of claim 9, the method further comprising receiving information about real-world sports by at least one of the first or the second computerized device.

16. The computerized system and method of claim 9, the method further comprising storing information about real-world sports by at least one of the server or the database.

17. The computerized system and method of claim 9, the method further comprising determining a winner of the fantasy sport game by at least one of the server, the first computerized device, or the second computerized device.

18. The computerized system and method of claim 17, the method further comprising obligating an amount of cryptocurrency to the winner by at least one of the server or the database.

19. The computerized system and method of claim 9, wherein the cryptocurrency is a proof-of-work cryptocurrency.

20. The computerized system and method of claim 9, wherein the cryptocurrency utilizes a smart contract for a transaction verification.

* * * * *